(12) United States Patent
Motohashi (10) Patent No.: US 7,719,945 B2
(45) Date of Patent: May 18, 2010

(54) INFORMATION RECORDING METHOD ALLOWING IMPROVED ACCESS TO A RECORDING START POSITION OF USER DATA IN AN INFORMATION RECORDING MEDIUM AND APPARATUS PERFORMING THE SAME

(75) Inventor: Tsutomu Motohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1043 days.

(21) Appl. No.: 11/127,136

(22) Filed: May 12, 2005

(65) Prior Publication Data

US 2005/0254380 A1    Nov. 17, 2005

(30) Foreign Application Priority Data

May 17, 2004    (JP)    ............... 2004-145742

(51) Int. Cl.
*G11B 7/00*    (2006.01)
(52) U.S. Cl. ................................. 369/59.25
(58) Field of Classification Search ............ None
See application file for complete search history.

(56) References Cited

U.S. PATENT DOCUMENTS

| | | | | |
|---|---|---|---|---|
| 6,671,249 B2 * | 12/2003 | Horie | ...................... | 369/275.3 |
| 2002/0046319 A1 | 4/2002 | Motohashi | | |
| 2003/0095484 A1 | 5/2003 | Motohashi | | |
| 2003/0163638 A1 | 8/2003 | Sasaki | | |
| 2003/0198145 A1 * | 10/2003 | Kimura et al. | ................. | 369/1 |
| 2003/0202782 A1 | 10/2003 | Motohashi et al. | | |
| 2004/0160867 A1 | 8/2004 | Motohashi | | |
| 2004/0202076 A1 | 10/2004 | Motohashi | | |
| 2005/0041479 A1 | 2/2005 | Motohashi | | |
| 2005/0044309 A1 | 2/2005 | Motohashi | | |

FOREIGN PATENT DOCUMENTS

| | | |
|---|---|---|
| JP | 63-104284 | 10/1986 |
| JP | 2003-208779 | 7/2003 |

OTHER PUBLICATIONS

"Data Interchange on 120 mm and 80 mm Optical Disk Using +R Format—Capacity: 4,7 and 1,46 Gbytes per Side (Recording Speed up to 8X)" ECMA International, Standard ECMA-349, 2nd Edition—Jun. 2004.

* cited by examiner

*Primary Examiner*—Joseph H Feild
*Assistant Examiner*—Joseph Haley
(74) *Attorney, Agent, or Firm*—Dickstein Shapiro LLP (57) ABSTRACT

A method of recording information in an information recording medium having a user data area and a management information area is disclosed. The method includes the steps of: (a) obtaining division information in at least a specified portion of the user data area; and (b) recording, in the management information area, information on the correspondence between multiple partial areas into which the specified portion of the user data area is divided based on the division information and multiple information parts in a management table, the information parts each storing information on the presence or absence of data.

11 Claims, 9 Drawing Sheets

INFORMATION RECORDING METHOD ALLOWING IMPROVED ACCESS TO A RECORDING START POSITION OF USER DATA IN AN INFORMATION RECORDING MEDIUM AND APPARATUS PERFORMING THE SAME

BACKGROUND OF THE INVENTION

1. Field of the Invention

The present invention relates generally to information recording methods and apparatuses, and more particularly to a method of recording information (data) in an information recording medium, an information recording apparatus suitable for performing the method, and a recording medium in which a program employed in the information recording apparatus is recorded.

2. Description of the Related Art

Optical disks such as CDs (compact disks) and DVDs (digital versatile disks) have attracted attention as information recording media for recording data, so that optical disk units have been widely used as information recording apparatuses for recording data in optical disks.

Recordable CDs include CD-Rs and CD-RWs, and recordable DVDs include DVD-Rs, DVD+Rs, DVD-RWs, and DVD+RWs. Data are recorded in and reproduced from those recordable CDs and DVDs in compliance with their respective predetermined standards.

According to the DVD+R standard, in order to access a recording start position on a disk at high speed, the user data area is divided into multiple partial areas each of 640 ECC blocks, and recorded area indicators (RAIs) storing information (maximum 256 items) indicating whether the corresponding partial areas are areas in which recording has been performed (recorded areas) are provided as disclosed in, for instance, Standard ECMA-349 Data Interchange on 120 mm and 80 mm Optical Disk using +R Format-Capacity: 4.7 and 1.46 Gbytes per Side $2^{nd}$ Edition (June 2004). When data is recorded in the user data area, information indicating that a partial area including the area in which the data is recorded is a recorded area is recorded in the RAI area. As a result, with respect to each partial area, it is possible to know whether the partial area is a recorded area.

As optical disks have become more popular, more types of data have been recorded in the optical disks, such as music data, video data, picture data, computer programs, and document data. Further, these data also differ greatly in amount. Accordingly, in some cases, it is necessary to determine with respect to a unit smaller than 640 ECC blocks whether the area is recorded (a recorded area). However, the information of the RAI area corresponds to the size of 640 ECC blocks. Accordingly, in order to determine with respect to a unit smaller than 640 ECC blocks whether the area is recorded, the user data area should actually be searched, thus causing the inconvenience that it takes time to access a recording start position.

SUMMARY OF THE INVENTION

Accordingly, it is a general object of the present invention to provide an information recording method and apparatus in which the above-described disadvantage is eliminated.

A more specific object of the present invention is to provide an information recording method and apparatus that make it possible to access the recording start position of user data in an information recording medium in a short period of time.

Another more specific object of the present invention is to provide a computer-readable recording medium in which a program to be executed by the control computer of the information recording apparatus so as to make it possible to access the recording start position of user data in an information recording medium in a short period of time is recorded.

One or more of the above objects of the present invention are achieved by a method of recording information in an information recording medium having a user data area and a management information area, the method including the steps of: (a) obtaining division information in at least a specified portion of the user data area; and (b) recording, in the management information area, information on a correspondence between a plurality of partial areas into which the specified portion of the user data area is divided based on the division information and a plurality of information parts in a management table, the information parts each storing information on presence or absence of data.

One or more of the above objects of the present invention are also achieved by an apparatus for recording information in an information recording medium having a user data area and a management information area, the apparatus including: an obtaining part configured to obtain division information in at least a specified portion of the user data area; and a processor configured to record, in the management information area, information on a correspondence between a plurality of partial areas into which the specified portion of the user data area is divided based on the division information and a plurality of information parts in a management table, the information parts each storing information on presence or absence of data.

According to one aspect of the present invention, multiple partial areas in a user data area are correlated with corresponding information parts in an RAI area based on specified division information. Accordingly, it is possible to establish a correspondence suitable for seeking out the boundary between a recorded area and an unrecorded area in the user data area with efficiency in accordance with the purpose of use of an information recording medium. Accordingly, it is possible to access the recording start position of user data in the information recording medium in a short period of time.

One or more of the above objects of the present invention are also achieved by a computer-readable recording medium storing a program for causing a computer to execute a method of recording information in an information recording medium having a user data area and a management information area, the method including the steps of: (a) obtaining division information in at least a specified portion of the user data area; and (b) recording, in the management information area, information on a correspondence between a plurality of partial areas into which the specified portion of the user data area is divided based on the division information and a plurality of information parts in a management table, the information parts each storing information on presence or absence of data.

According to one aspect of the present invention, it is possible to cause a computer (for instance, the control computer of an information recording apparatus) to execute a method of recording information in an information recording medium according to the present invention. Accordingly, it is possible to access the recording start position of user data in the information recording medium in a short period of time.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

Figure 1:
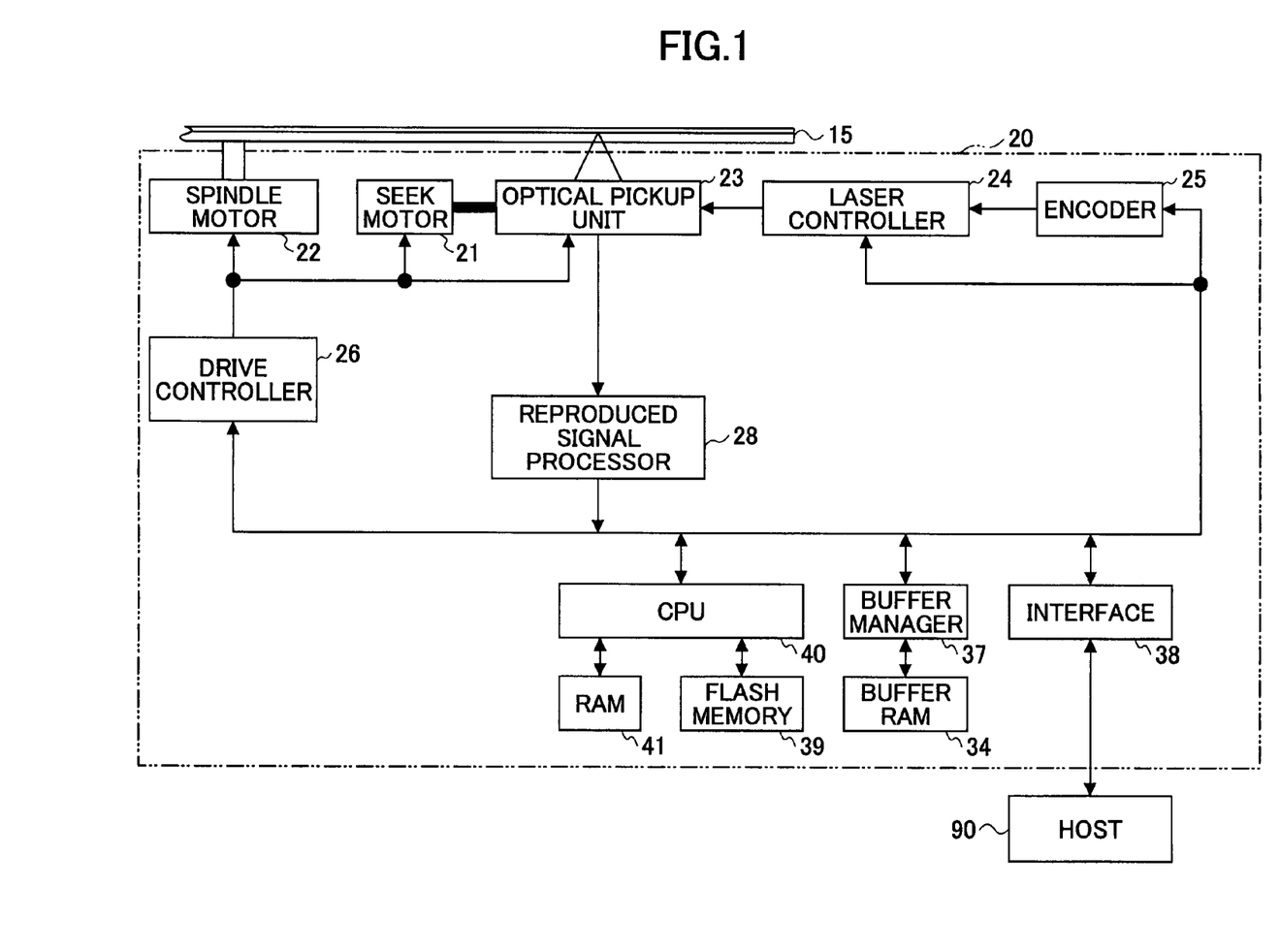
FIG. 1 is a block diagram illustrating an optical disk unit according to an embodiment of the present invention.

FIG. 1 is a block diagram illustrating an optical disk unit 20 serving as an information recording apparatus according to the embodiment of the present invention.

The optical disk unit 20 includes a spindle motor 22 for rotating an optical disk 15, an optical pickup unit 23, a seek motor 21 for driving the optical pickup unit 23 in the radial directions of the optical disk 15, a laser controller circuit 24, an encoder 25, a drive controller circuit 26, a reproduced signal processor circuit 28, a buffer RAM 34, a buffer manager 37, an interface 38, a flash memory 39, a CPU 40, and a RAM 41. In FIG. 1, the arrows indicate typical signal and information flows, and do not represent all the interconnections of the blocks. Further, according to this embodiment, an information recording medium based on the DVD+R standard is employed as the optical disk 15. Further, according to this embodiment, data recording is performed ECC block by ECC block.

The optical pickup unit 23 emits laser light onto the recording surface of the optical disk 15, on which a spiral track or concentric tracks are formed, and receives reflected light from the recording surface. The optical pickup unit 23 includes a semiconductor laser, an optical system, a light receiver, and a drive system (including a focusing actuator and a tracking actuator), which are not graphically illustrated. The optical system, which includes an objective lens, guides a light beam emitted from the semiconductor laser onto the recording surface of the optical disk 15, and guides a returning light beam reflected from the recording surface to a predetermined light-receiving position. The light receiver is provided at the predetermined light-receiving position to receive the returning light beam. The light receiver outputs a signal corresponding to the amount of its received light to the reproduced signal processor circuit 28.

The reproduced signal processor circuit 28 obtains servo signals such as a focus error signal and a tracking error signal, address information, a synchronization signal, and an RF signal based on the output signal of the light receiver of the optical pickup unit 23. The obtained servo signals are output to the drive controller circuit 26. The address information is output to the CPU 40. The synchronization signal is output to the encoder 25. Further, the reproduced signal processor circuit 28 performs decoding and error detection on the RF signal. When an error is detected, the reproduced signal processor circuit 28 performs error correction on the RF signal, and thereafter, stores the error-corrected RF signal in the buffer RAM 34 through the buffer manager 37 as reproduced data.

The drive controller circuit 26 generates, based on the tracking error signal, a drive signal to drive the tracking actuator for correcting the positional error of the objective lens in the tracking direction. The drive controller circuit 26 also generates, based on the focus error signal, a drive signal to drive the focusing actuator for correcting the focus error of the objective lens. The generated drive signals are output to the optical pickup unit 23, so that tracking control and focus control are performed. The drive controller circuit 26 also generates a drive signal to drive the seek motor 21 and a drive signal to drive the spindle motor 22 based on commands from the CPU 40. The generated drive signals are output to the seek motor 21 and the spindle motor 22, respectively.

Data to be recorded in the optical disk 15 (recording data) and data reproduced from the optical disk 15 (reproduced data) are stored temporarily in the buffer RAM 34. The input of data to and the output of data from the buffer RAM 34 are managed by the buffer manager 37.

Based on a command from the CPU 40, the encoder 25 extracts recording data stored in the buffer RAM 34 through the buffer manager 37, performs modulation on the data, and adds an error correction code to the data, thereby generating a write signal to write the data in the optical disk 15. The generated write signal is output to the laser controller circuit 24.

The laser controller circuit 24 controls the light emission power of the semiconductor laser of the optical pickup unit 23. For instance, in the case of recording, the laser controller circuit 24 generates a drive signal to drive the semiconductor laser based on the write signal, recording conditions, and the light emission characteristics of the semiconductor laser.

The interface 38 is a bidirectional communications interface with a host apparatus 90 such as a personal computer. The interface 38 is based on a standard interface such as ATAPI (AT Attachment Packet Interface), SCSI (Small Computer System Interface), or USB (Universal Serial Bus).

The flash memory 39 includes a program area and a data area. Programs including a program written in a code decodable by the CPU 40 according to the present invention are stored in the program area. Recording conditions and the light emission characteristics of the semiconductor laser are stored in the data area.

The CPU 40 controls the operation of each of the above-described elements in accordance with the programs stored in the program area of the flash memory 39. The CPU 40 stores data necessary for the control in the RAM 41 and the buffer RAM 34.

Figure 2:
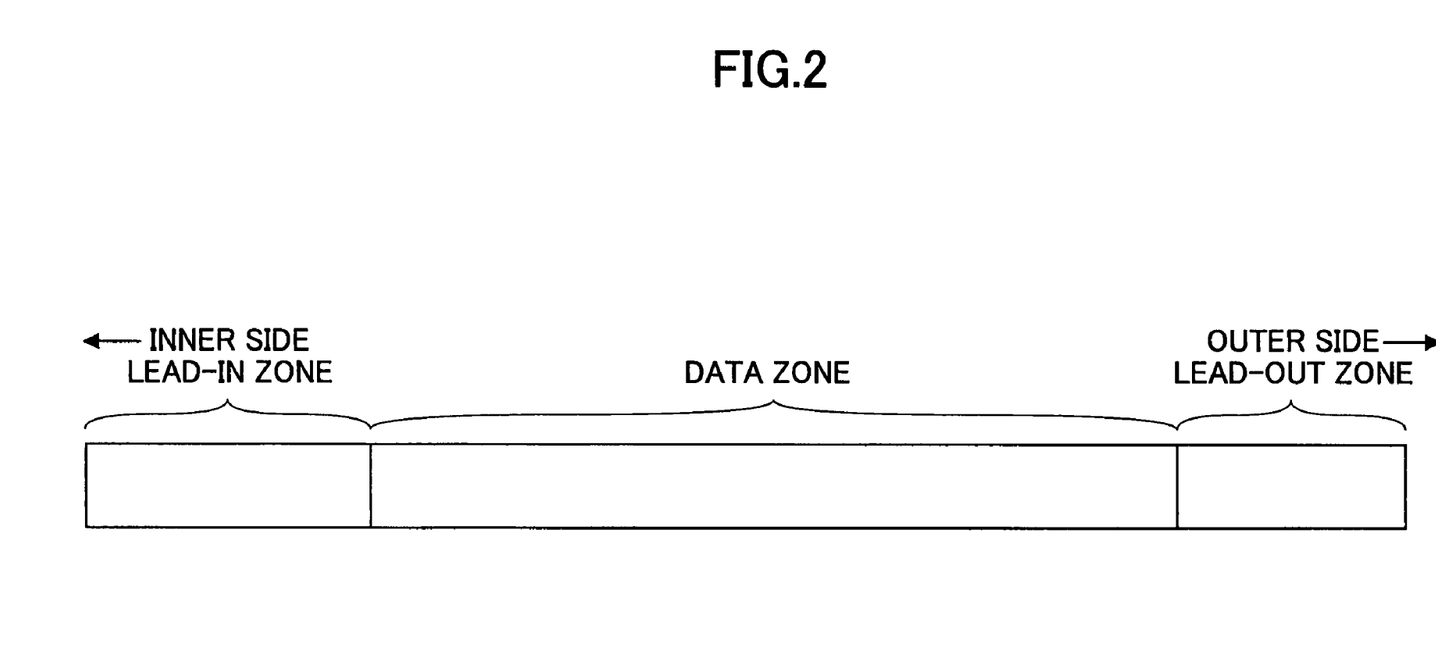
FIG. 2 is a diagram for illustrating a recording area layout in an optical disk according to the embodiment of the present invention.

Next, a description is given of the layout (disk layout) of the recording area of the optical disk 15. A spiral track is formed as a recording area on the recording surface of the optical disk 15. For instance, the recording area is divided into the areas of Lead-in Zone, Data Zone, and Lead-out Zone from the inner side to the outer side as illustrated in FIG. 2. A user data area is included in the Data Zone. The RAIs serving as a management table are recorded in the Lead-in Zone.

Figure 3:
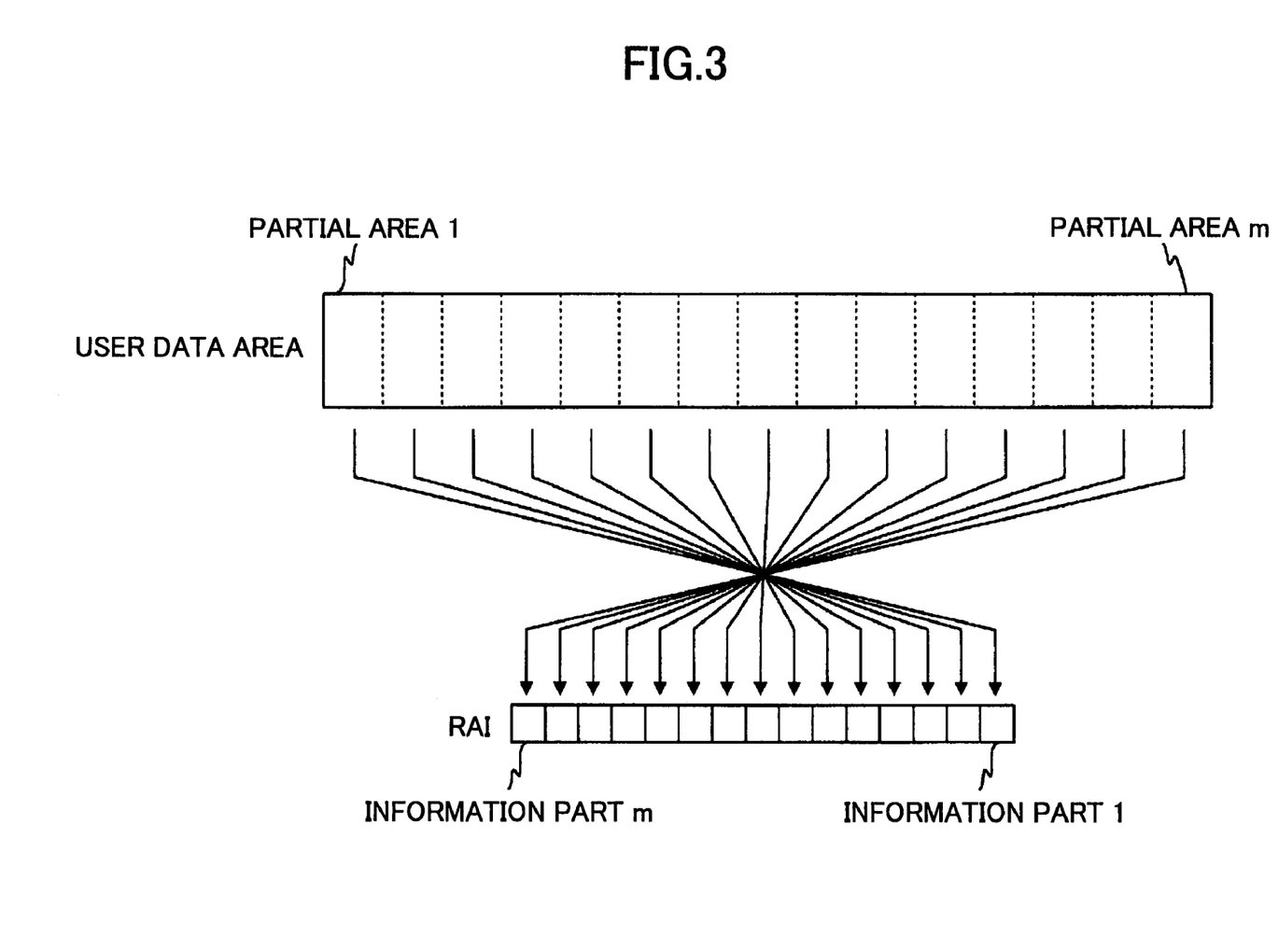
FIG. 3 is a diagram for illustrating an RAI area according to the embodiment of the present invention.

As illustrated in FIG. 3, the RAI area (the RAIs) has multiple information parts 1 through m in each of which information indicating the presence or absence of data (data presence/absence information) is stored. Each of the information parts 1 through m is correlated with a corresponding one of partial areas of the user data area. In the case of FIG. 3, the information parts 1 through m correspond to partial areas 1 through m, respectively, of the user data area. When user data is recorded in the user data area, predetermined information is recorded in an information part corresponding to a partial area including the area in which the user data is recorded in order to indicate that the partial area is a recorded area.

Figure 4:
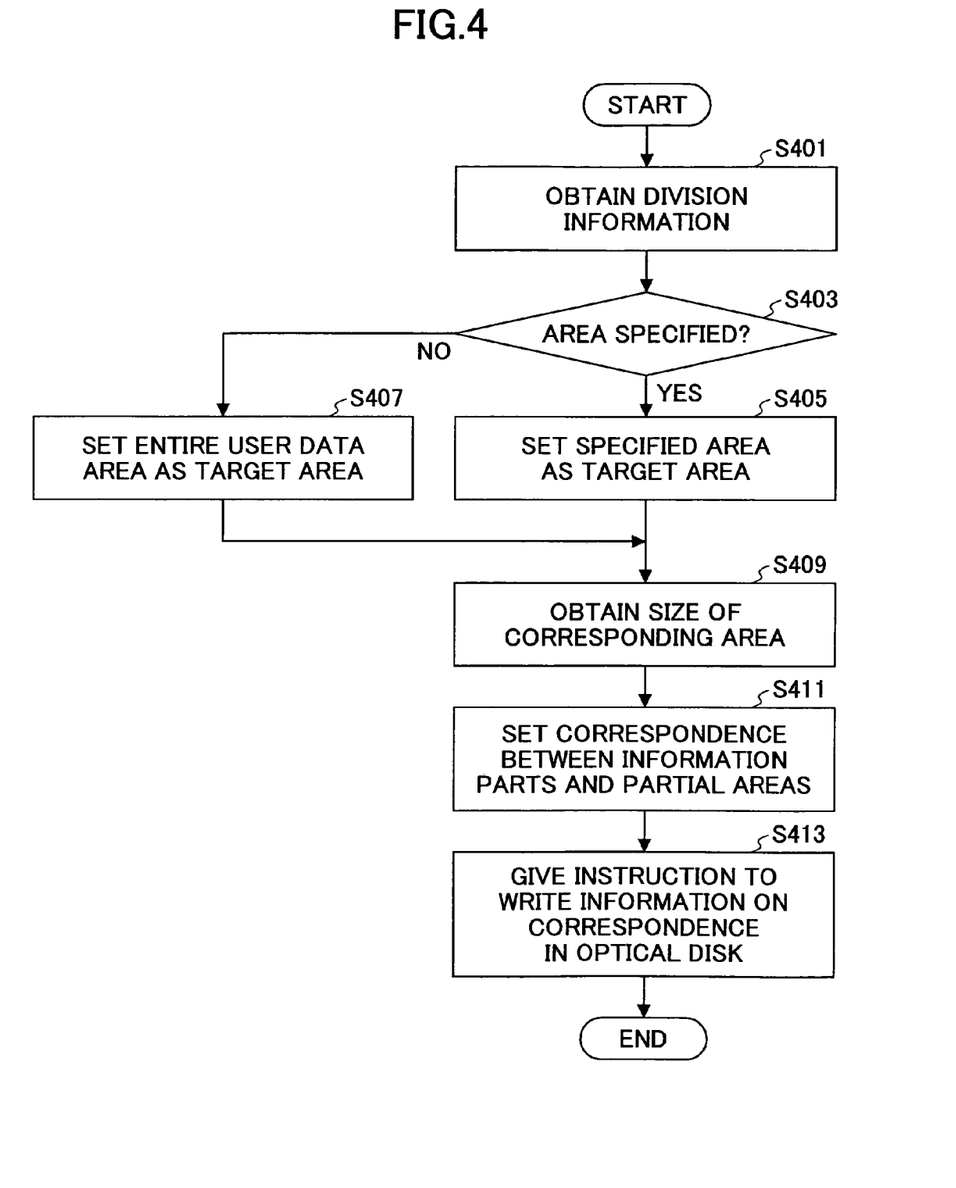
FIG. 4 is a flowchart of a correspondence setting operation according to the embodiment of the present invention.

Next, a description is given, with reference to FIG. 4, of an operation for setting a correspondence between the information parts of the RAI area and partial areas of the user data area in response to a user's request. The flowchart of FIG. 4 corresponds to a series of processing algorithms executed by the CPU 40 (FIG. 1).

When a request to set a correspondence is received from the host apparatus 90 (FIG. 1), the starting address of a program corresponding to the flowchart of FIG. 4 (hereinafter referred to as "setting program") is set in the program counter of the CPU 40, so that the operation is started.

First, in step S401, division information for setting the correspondence is obtained from the host apparatus 90.

Next, in step S403, it is determined whether the division information includes information specifying an area to be managed (a management area). If the division information includes information specifying a management area (that is, YES in step S403), the operation proceeds to step S405.

In step S405, the specified area is determined (set) as a target area.

Next, in step S409, information on the size of a single partial area is obtained from the division information.

Next, in step S411, the correspondence between the information parts and the partial areas is set.

Next, in step S413, an instruction is given to record information on the correspondence in the Lead-in Zone of the optical disk 15. Here, information on the starting address of the partial area corresponding to the information part 1 and the size of a single partial area is recorded. Thereafter, the operation ends.

If it is determined in step S403 that the division information does not include information specifying a management area (that is, NO in step S403), the operation proceeds to step S407.

In step S407, the entire user data area is determined (set) as a target area. Then, the operation proceeds to step S409.

Figure 5:
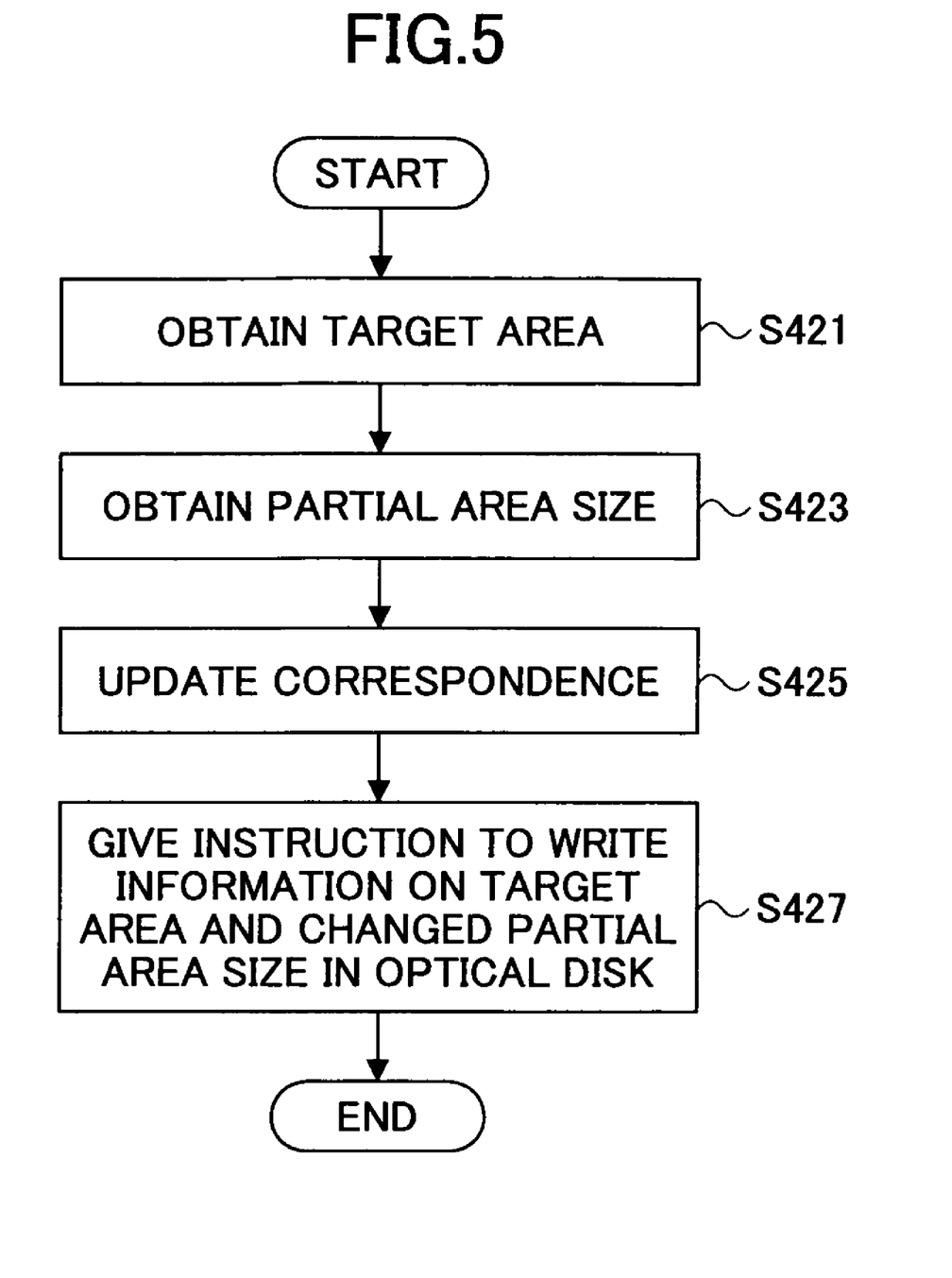
FIG. 5 is a flowchart of a correspondence changing operation according to the embodiment of the present invention.

Next, a description is given, with reference to FIG. 5, of an operation for changing the size of a partial area in response to a user's request. The flowchart of FIG. 5 corresponds to a series of processing algorithms executed by the CPU 40 (FIG. 1).

When a request to change a partial area size is received from the host apparatus 90 (FIG. 1), the starting address of a program corresponding to the flowchart of FIG. 5 (hereinafter referred to as "changing program") is set in the program counter of the CPU 40, so that the operation is started.

First, in step S421, a target area (an area in which a partial area size is to be changed) specified by the user is obtained.

Next, in step S423, a partial area size specified by the user, to which the current partial area size is to be changed, is obtained.

Next, in step S425, the correspondence between the information parts and the partial areas is updated based on the target area and the partial area size obtained in steps S421 and S423, respectively.

Next, in step S427, an instruction to record information on the target area and the changed partial area size in the Lead-in Zone of the optical disk 15 is given. Then, the operation ends.

Figure 6:
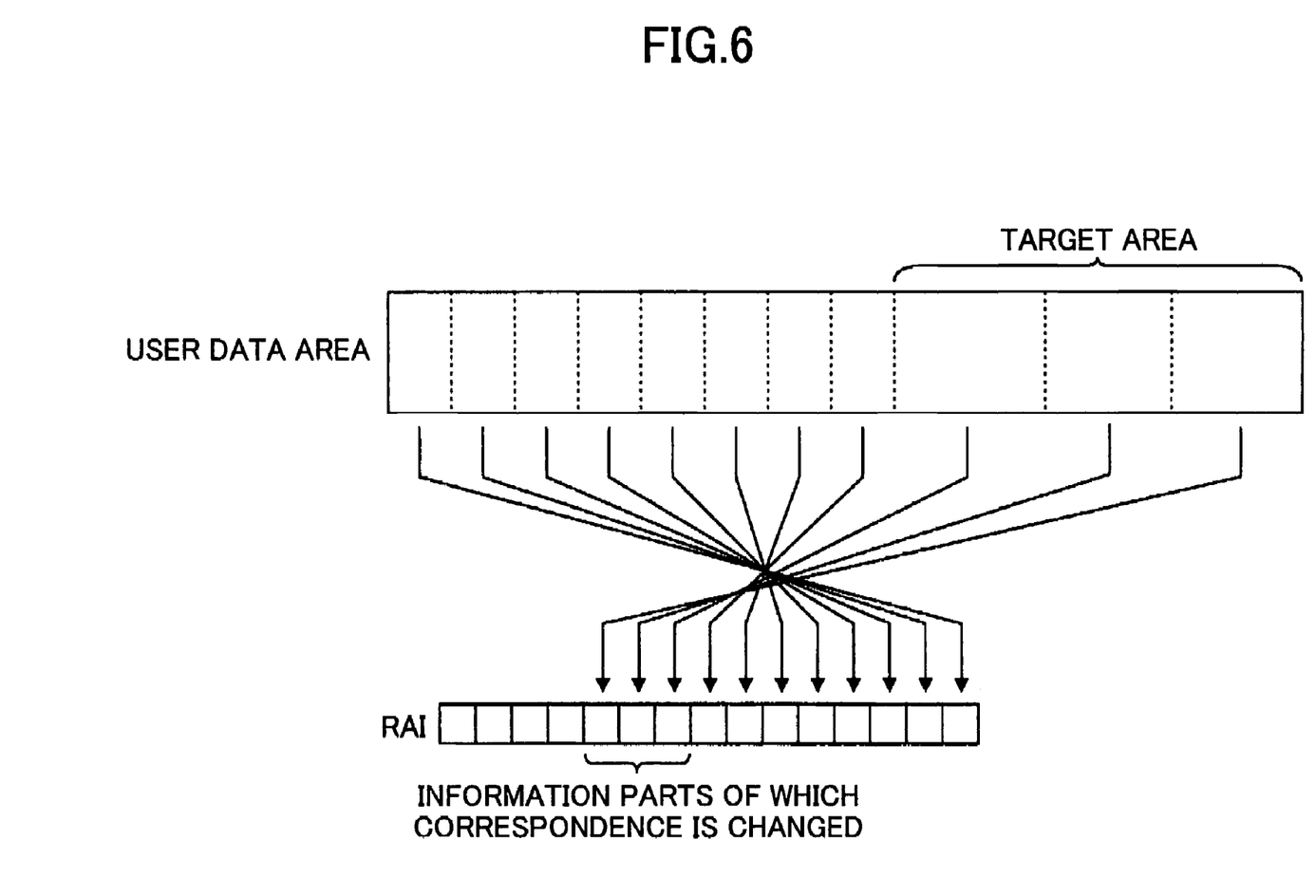
FIG. 6 is a diagram for illustrating a correspondence changed by the correspondence changing operation of FIG. 5 according to the embodiment of the present invention.

As a result, for instance, as illustrated in FIG. 6, the size of each partial area included in the specified target area is changed.

Figure 7:
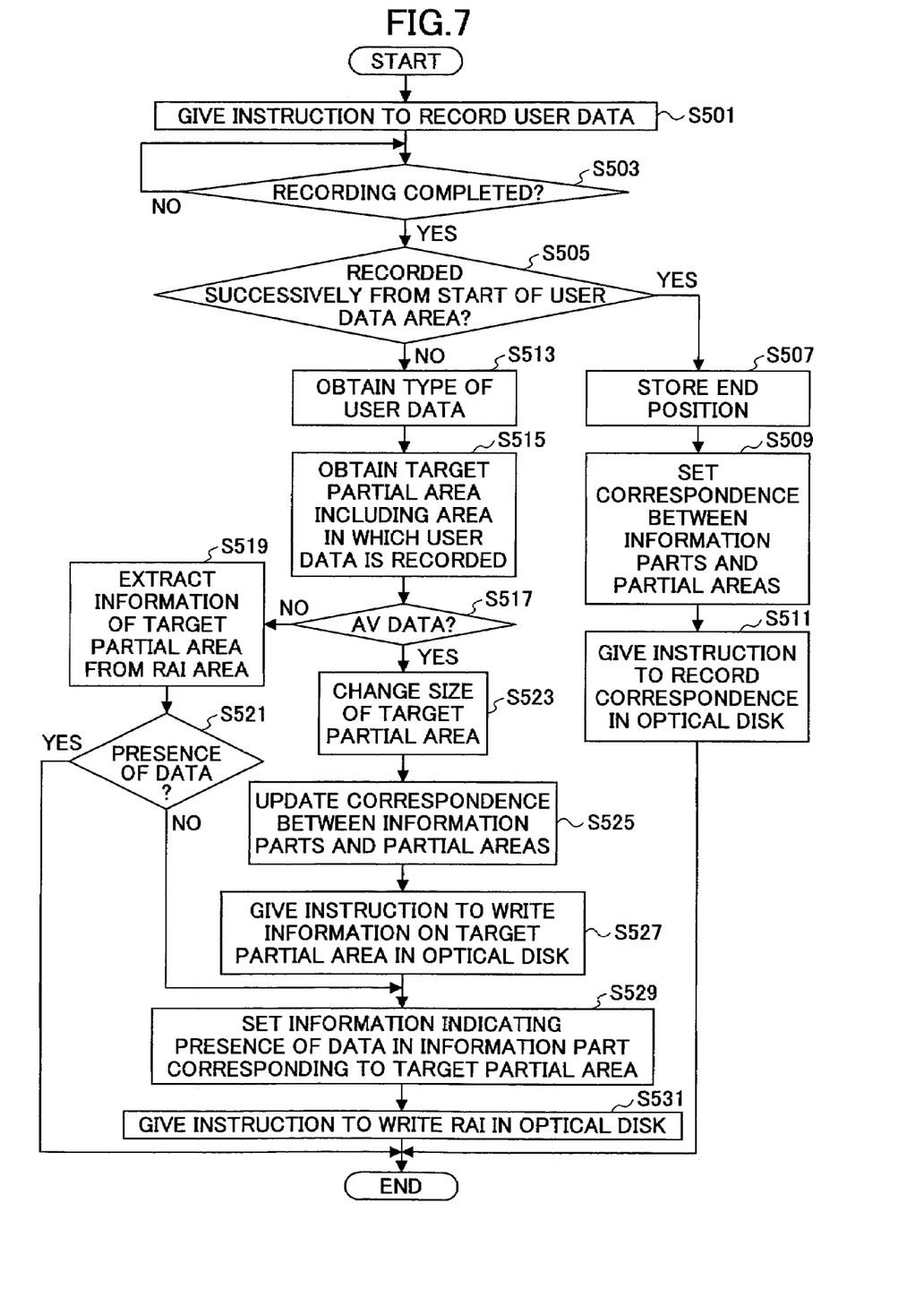
FIG. 7 is a flowchart of a recording operation according to the embodiment of the present invention.

Next, a description is given, with reference to FIG. 7, of an operation for recording user data in the user data area. The flowchart of FIG. 7 corresponds to a series of processing algorithms executed by the CPU 40 (FIG. 1).

When a request to record user data is received from the host apparatus 90 (FIG. 1), the starting address of a program corresponding to the flowchart of FIG. 7 (hereinafter referred to as "recording program") is set in the program counter of the CPU 40, so that the operation is started.

First, in step S501, when the optical disk 15 is rotated by the spindle motor 22 at a linear velocity (or angular velocity) corresponding to recording rate, and the position of formation of a light spot reaches a target position, writing of user data is authorized. As a result, the user data is recorded using the encoder 25, the laser controller circuit 24, and the optical pickup unit 23.

Next, in step S503, it is determined whether the recording of the user data is completed. If the recording is not completed (that is, NO in step S503), after a predetermined wait period, it is again determined whether the recording is completed. If the recording is completed (that is, YES in step S503), the operation proceeds to step S505.

In step S505, it is determined whether the user data is recorded successively from the start of the user data area. If the user data is recorded successively from the start of the user data area (that is, YES in step S505), the operation proceeds to step S507.

In step S507, information on the end position (end address) of the area in which the user data is recorded is recorded in the optical disk 15.

Figure 8A:
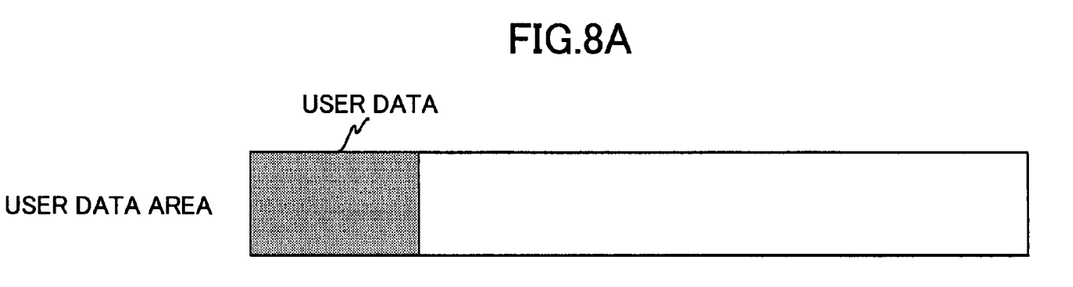
FIGS. 8A and 8B are diagrams for illustrating a correspondence set in the recording operation of FIG. 7 according to the embodiment of the present invention.
Figure 8B:
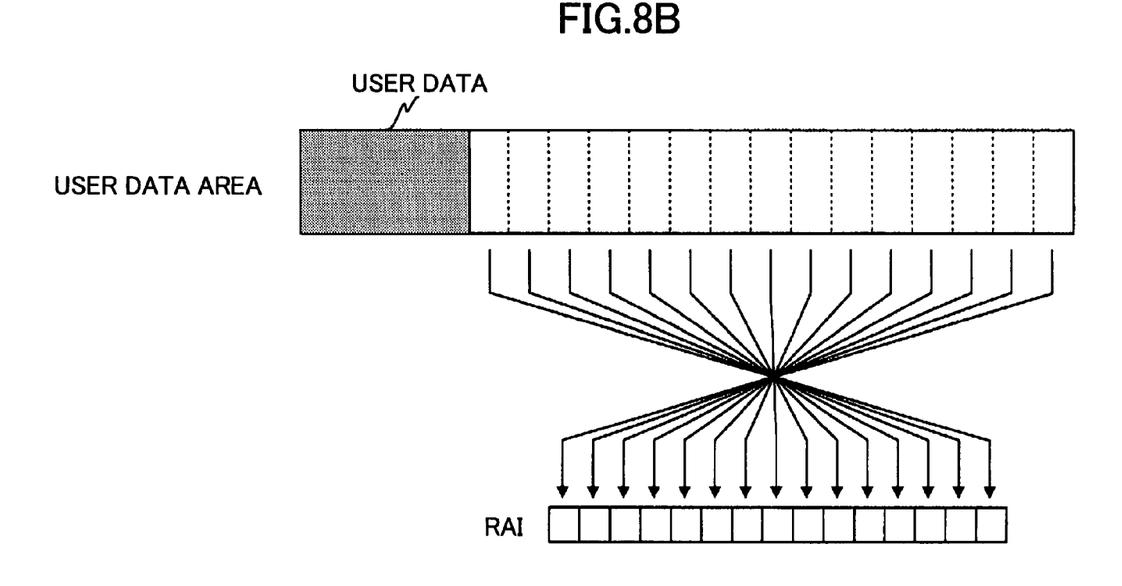

Next, in step S509, the correspondence between information parts and partial areas is set. For instance, as illustrated in FIGS. 8A and 8B, the user data area except the part (area) thereof in which the user data is recorded is divided into a preset number of (for instance, 256) partial areas, and the partial areas are correlated with corresponding information parts.

Next, in step S509, information on the correspondence is recorded in the Lead-in Zone of the optical disk 15. Then, the operation ends.

If it is determined in step S505 that the user data is not recorded successively from the start of the user data area (that is, NO in step S505), the operation proceeds to step S513.

In step S513, the type of the recorded user data is obtained.

Next, in step S515, a partial area including the area in which the user data is recorded is obtained and determined (set) as a target partial area.

Next, in step S517, it is determined whether the type of the user data is AV data. If the type of the user data is not AV data (that is, NO in step S517), the operation proceeds to step S519. Normally, AV data is determined to be stream data. Accordingly, it can be determined from a recording request command whether the type of the user data is AV data.

In step S519, the information (data presence/absence information) of the target partial area is extracted from the RAI area, referring to the correspondence between the information parts and the partial areas.

Next, in step S521, it is determined whether the information of the target partial area indicates the presence of data. If the information of the target partial area does not indicate the presence of data (that is, NO in step S521), the operation proceeds to step S529.

In step S529, information indicating the presence of data is set as the information of the target partial area in the RAI area. That is, information indicating the presence of data is set in the information part corresponding to the target partial area.

Next, in step S531, the RAI is recorded in the Lead-in Zone of the optical disk 15.

If it is determined in step S517 that the type of the user data is AV data (that is, YES in step S517), the operation proceeds to step S523.

In step S523, the size of the target partial area is changed. For instance, the size of the target partial area is changed to be twice a default size.

Next, in step S525, the correspondence between the information parts and the partial areas is updated.

Next, in step S527, information on the target partial area including its position and its changed size is recorded in the Lead-in Zone of the optical disk 15. Then, the operation proceeds to step S529.

Figure 9:
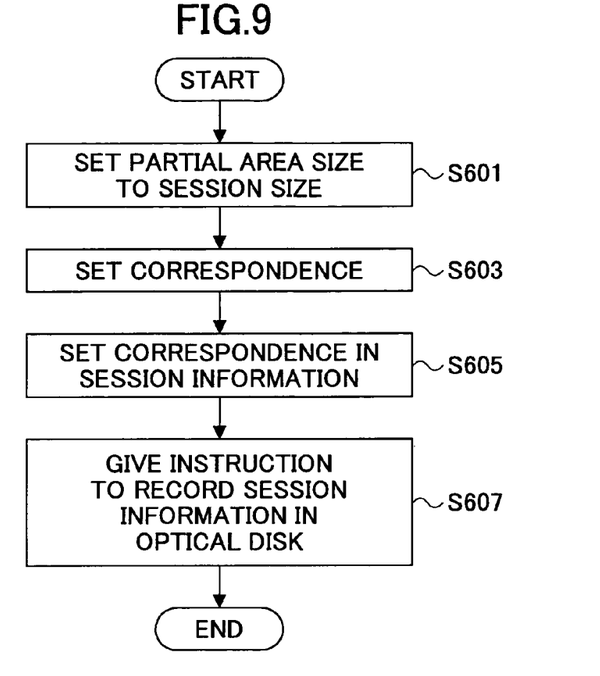
FIG. 9 is a flowchart of a correspondence setting operation in the case of multisession recording according to the embodiment of the present invention.

In the case of performing recording in the optical disk 15 in a multisession format, when a new session is set, a program corresponding to the flowchart of FIG. 9 is started.

First, in step S601, the size of a partial area is set to a value equal to the amount of data in the session.

Next, in step S603, a correspondence is set. That is, the partial area is correlated with a corresponding information part.

Next, in step S605, the correspondence is set in session information. Specifically, the correspondence is set in a session item in a session disk control block (SDCB).

Next, in step S607, the session information is recorded in the optical disk 15. Then, the operation ends.

Figure 10:
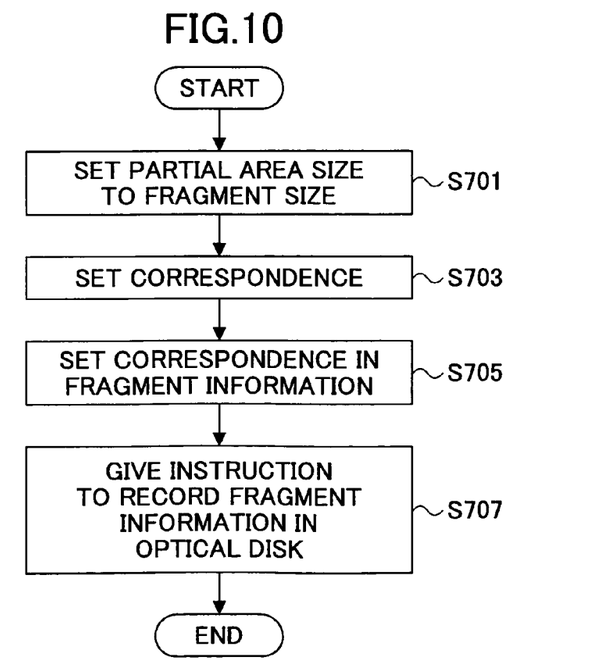
FIG. 10 is a flowchart of a correspondence setting operation in the case of multisession recording with a session being composed of multiple fragments according to the embodiment of the present invention.

Further, in the case of performing recording in the optical disk 15 in a multisession format with a session being composed of multiple fragments, when a new fragment is set, a program corresponding to the flowchart of FIG. 10 is started.

First, in step S701, the size of a partial area is set to a value equal to the amount of data in the fragment.

Next, in step S703, a correspondence is set. That is, the partial area is correlated with a corresponding information part.

Next, in step S705, the correspondence is set in fragment information. Specifically, the correspondence is set in a fragment item in the SDCB.

Next, in step S707, the fragment information is recorded in the optical disk 15. Then, the operation ends.

As described above, according to the optical disk unit 20 of this embodiment, an obtaining part, a processor, a changing part, and a determination part are realized by the CPU 40 and the programs executed thereby. That is, the obtaining part is realized by the operation of steps S401 through S409 of FIG. 4, and the processor is realized by the operation of steps S411 and S413 of FIG. 4. Further, the changing part is realized by the operation of steps S421 through S427, and the determination part is realized by the operation of steps S513 and S517 of FIG. 7. At least a portion or all of the above-described obtaining part, processor, changing part, and determination part realized by the operations according to the programs executed by the CPU 40 may be configured by hardware.

Further, in this embodiment, a program according to the present invention is executed in those corresponding to the flowcharts of FIGS. 4, 5, and 7 of the programs stored in the flash memory 39. That is, a first process is executed by the program corresponding to the operation of steps S401 through S409 of FIG. 4, and a second process is executed by the program corresponding to the operation of steps S411 and 413. Further, a third process is executed by the program corresponding to the operation of steps S421 through S427 of FIG. 5, and a fourth process is executed by the program corresponding to the operation of steps S513 and S517 of FIG. 7.

A recording method according to the present invention is performed in the operations of FIGS. 4, 5, 7, 9, and 10. That is, a first process is performed in the operation of steps S401 through S409 of FIG. 4, and a second process is performed in the operation of steps S411 and 413. Further, a third process is performed in the operation of steps S421 through S427 of FIG. 5, and a fourth process is performed in the operation of steps S513 and S517 of FIG. 7.

As described above, according to the optical disk unit 20 of this embodiment, division information in at least a specified portion of the user data area is obtained, and information on the correspondence between multiple partial areas into which the specified portion of the user data area is divided based on the division information and multiple information parts in the RAI area (a management table) each storing data presence/absence information is recorded in the Lead-in Zone (a management information area). In this case, the multiple partial areas in the user data area are correlated with corresponding information parts in the RAI area based on the specified division information. Accordingly, it is possible to establish a correspondence suitable for seeking out the boundary between a recorded area and an unrecorded area in the user data area with efficiency in accordance with the purpose of use of an optical disk (an information recording medium). Accordingly, it is possible to access the recording start position of user data in the information recording medium in a short period of time.

In the case of recording user data successively from the start of the user data area, since the user data area except the part (area) thereof in which the user data is recorded is divided into multiple partial areas, the size of a partial area corresponding to a single information part can be reduced. Accordingly, it is possible to seek out the boundary between a recorded area and an unrecorded area in a shorter period of time than conventionally.

Further, in the case of performing recording in the user data area in a multisession format, a corresponding area can be equalized in size with a session. Accordingly, it is possible to seek out the boundary between a recorded area and an unrecorded area in a shorter period of time than conventionally.

Further, in the case of performing recording in the user data area in a multisession format with each session being composed of multiple fragments, a corresponding area can be equalized in size with a fragment. Accordingly, it is possible to seek out the boundary between a recorded area and an unrecorded area in a shorter period of time than conventionally.

Further, at least one of multiple partial areas can be changed in size, and the correspondence between information parts and partial areas can be updated. Accordingly, for instance, it is possible to set an information part-partial area correspondence suitable for multiple purposes.

Further, it is possible to determine the type of user data to be recorded in the user data area, and change the size of a partial area including the area in which the user data is recorded based on the determination result. Accordingly, it is possible to set an information part-partial area correspondence suitable for data.

In the above-described embodiment, a DVD+R is employed as the optical disk 15. However, the present invention is applicable not only to the DVD+R but also to other types of DVDs, CDs, and next-generation information recording media supporting light of an approximately 405 nm wavelength.

In the above-described embodiment, the RAI is employed as a management table. However, the management table is not limited to the RAI.

In the above-described embodiment, the optical disk 15 is employed as an information recording medium. However, the information recording medium is not limited to the optical disk. In the case of employing an information recording medium other than the optical disk, an information recording apparatus suitable for the information recording medium is employed instead of the optical disk unit 20.

In the above-described embodiment, the programs according to the present invention are recorded in the flash memory 39. Alternatively, the programs according to the present invention may be recorded in other recording media such as CDs, magneto-optical disks, DVDs, memory cards, USB memories, and flexible disks. In this case, the programs according to the present invention are loaded into the flash memory 39 through reproduction apparatuses (or dedicated interfaces) corresponding to the respective recording media. Alternatively, the programs according to the present invention may be transferred to the flash memory 39 through a network such as a LAN, an intranet, or the Internet. That is, the programs according to the present invention have only to be stored in the flash memory 39.

Further, in the above-described embodiment, the optical pickup unit 23 has one semiconductor laser. Alternatively, the optical pickup unit 23 may have multiple semiconductor lasers emitting respective light beams of wavelengths different from each other. In this case, for instance, the optical pickup unit 23 may include at least one of a semiconductor laser emitting a light beam of an approximately 405 nm wavelength, a semiconductor laser emitting a light beam of an approximately 660 nm wavelength, and a semiconductor laser emitting a light beam of an approximately 780 nm wavelength. That is, the optical disk unit 20 may support different types of optical disks based on respective standards different from each other.

The present invention is not limited to the specifically disclosed embodiment, and variations and modifications may be made without departing from the scope of the present invention.

The present application is based on Japanese Priority Patent Application No. 2004-145742, filed on May 17, 2004, the entire contents of which are hereby incorporated by reference.

What is claimed is:

1. A method of recording information in an information recording medium having a user data area and a management information area, the method comprising the steps of:
   (a) obtaining division information in at least a specified portion of the user data area; and
   (b) recording, in the management information area, information on a correspondence between a plurality of partial areas into which the specified portion of the user data area is divided based on the division information and a plurality of information parts in a management table, the information parts each storing information on whether each of the plurality of partial areas is a recorded area.

2. The method as claimed in claim 1, wherein the division information is information on division in the user data area except a part thereof in which user data is successively recorded from a start of the user data area.

3. The method as claimed in claim 1, wherein:
   the division information includes information on a size of each of the partial areas;
   recording in the user data area is performed in a multisession format; and
   the size of each of the partial areas is a size of a session.

4. The method as claimed in claim 1, wherein:
   the division information includes information on a size of each of the partial areas;
   recording in the user data area is performed in a multisession format with each of sessions being composed of multiple fragments; and
   the size of each of the partial areas is a size of a corresponding one of the fragments.

5. The method as claimed in claim 1, wherein:
   the information recording medium is an optical disk based on a DVD+R standard; and
   the management table comprises a recorded area indicator.

6. An apparatus for recording information in an information recording medium having a user data area and a management information area, the apparatus comprising:
   an obtaining part configured to obtain division information in at least a specified portion of the user data area; and
   a processor configured to record, in the management information area, information on a correspondence between a plurality of partial areas into which the specified portion of the user data area is divided based on the division information and a plurality of information parts in a management table, the information parts each storing information on whether each of the plurality of partial areas is a recorded area.

7. The apparatus as claimed in claim 6, wherein the division information is information on division in the user data area except a part thereof in which user data is successively recorded from a start of the user data area.

8. The apparatus as claimed in claim 6, wherein:
   the division information includes information on a size of each of the partial areas;
   recording in the user data area is performed in a multisession format; and
   the size of each of the partial areas is a size of a session.

9. The apparatus as claimed in claim 6, wherein:
   the division information includes information on a size of each of the partial areas;
   recording in the user data area is performed in a multisession format with each of sessions being composed of multiple fragments; and
   the size of each of the partial areas is a size of a corresponding one of the fragments.

10. The apparatus as claimed in claim 6, wherein:
    the information recording medium is an optical disk based on a DVD+R standard; and
    the management table comprises a recorded area indicator.

11. A computer-readable recording medium storing a program for causing a computer to execute a method of recording information in an information recording medium having a user data area and a management information area, the method comprising the steps of:
    (a) obtaining division information in at least a specified portion of the user data area; and
    (b) recording, in the management information area, information on a correspondence between a plurality of partial areas into which the specified portion of the user data area is divided based on the division information and a plurality of information parts in a management table, the information parts each storing information on whether each of the plurality of partial areas is a recorded area.

* * * * *